United States Patent Office 3,288,230
Patented Nov. 29, 1966

3,288,230
METHOD OF PREVENTING GAS LOSS DURING GAS DRILLING
Frank H. Braunlich, Jr., and Warren M. Zingg, Tulsa, Okla., assignors to The Dow Chemical Company, Midland, Mich., a corporation of Delaware
No Drawing. Filed Mar. 24, 1964, Ser. No. 354,466
4 Claims. (Cl. 175—72)

The present invention relates to a method for preventing the loss of gas to permeable formations during gas drilling of holes and wells into such formations. Air is commonly utilized during drilling as a cooling medium and as a carrier to remove the drilled rock or cuttings from the borehole. If the borehole passes through rock of sufficient permeability, much of the air will leak away and the drilling cannot be continued.

The art of preventing loss of fluids from bore-holes is highly developed with respect to liquids. Numerous materials and associated methods are known to use with drilling liquids to prevent their loss into the formation. With the advent of drilling using air and other gases in place of liquids, some methods have been developed for preventing the loss of gas. These methods necessitate discontinuing the gas circulation, removing the drill from the hole, inserting the proper packers and other tools, and forcing a cement, plastic or other liquid plugging agent into the formation to close off the permeability. Drilling may then be resumed, but the entire time consuming and laborious process must be repeated if the continued drilling encounters more permeable formations and the gas again leaks off. Consequently there is a dire need for simple, rapid and efficient means for preventing loss of gas to formations.

Accordingly the principal object of this invention is to provide a means for preventing loss of gas to permeable formations during gas drilling of boreholes and wells into such formations.

Another object of this invention is to provide a means of preventing loss of gas which may be applied without removing the drilling tools from the hole and may be applied continuously in conjunction with the drilling operation.

The invention is predicated upon the discovery that plugging of permeable formations may be carried out during gas drilling operations by mixing a charge of a pulverulent water swellable gum, silicate or polymer with the drilling gas and following with a charge of a mist of water or a water base film forming agent. It was found in accordance with this invention, that as the drilling gas carrying swellable particles passes through the permeable rock, the particles are trapped within the pores of the rock. When a charge of water mist is introduced, the mist meets the particles which swell and in turn close off at least a portion, if not all, of the pores. If the pores are not all plugged, the introduction of particles and of water mist may be repeated alternately to produce increased plugging action and in time completely plug the permeability. The mist may be water alone, or water with a coating agent to aid in preventing dehydration of the swollen particles.

When drilling is resumed, drying and shrinkage may occur with some return of permeability, depending upon the composition of the particles. It has been found this can be easily and immediately repaired with a charge of mist in the drilling air or other gas. Nevertheless, the periods between repairs can be extended by a coating agent.

Pulverulent materials suitable for use in accordance with this invention are those silicates, natural gums and synthetic polmeric materials available in particulate form and which fairly readily become swollen by hydration with water. Examples of such materials are bentonitic silicates or clays, and natural gums including guar, karaya, locust bean and the like. Satisfactory synthetic polymers are those which become swollen by aqueous media but which are sufficiently polymerized to be water insoluble. Polymers which are, to a limited degree, cross-linked may have this quality. Such polymers without crosslinking are water soluble, and if highly crosslinked will not hydrate and swell, but if they are partially crosslinked they swell to 5 to 50 or more times the dry volume.

An example of a prefered polymer suitable for use according to this invention is the product of copolymerization of acrylamide with N,N'-methylene-bis-acrylamide. The resulting limited crosslinked polymer is sufficiently crosslinked to be insoluble in aqueous liquids, but retains the ability to swell in aqueous solutions. The polymerization process is commonly carried out by heating in an aqueous system acrylamide containing about 4600 parts per million by weight of N,N'-methylene-bis-acrylamide. Polymerization is effected using any of the usual water-soluble oxygen-containing catalysts, such as the ammonium, potassium and sodium persulfates, hydrogen peroxide or an organic hydroperoxide, or the alkali metal and ammonium chlorates and the like. It is generally desirable to use a redox catalyst system of an oxygen-containing compound with a reducing agent such as sodium thiosulfate, sodium or potassium bisulfite or metabisulfite, according to known methods. The polymer product is dried as on a drum dryer and is ground to a particle size of preferably about 95% through a 200-mesh sieve. Although N,N'-methylene-bis-acrylamide is a preferred and commercially available compound for use with acrylamide to produce a limited crosslinked copolymer, other alkylidene bisacrylamides are suitable; the suitable compounds may be generally characterized by the formula:

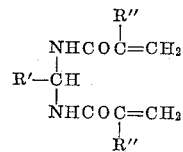

wherein R' is a hydrocarbon residue of an aldehyde and R" is of the group consisting of hydrogen and the methyl radical.

Acrylamide is a preferred comonomer, although any ethylenic compound with a solubility of at least about 2% by weight and preferably at least about 5% in water and which copolymerizes with the alkylidene bisacrylamides in aqueous systems is satisfactory in producing a polymer operable in accordance with the invention.

The swellable synthetic polymers taught in U.S. Patent No. 2,810,716 constitute materials which, when in pulverulent form, are satisfactory for plugging permeable formations in the operation of this invention.

The pulverulent material should be of such size that it is readily carried by the gas as it is injected into the borehole during air drilling operations. In gas drilling operations, the rate of flow of the gas may vary more according to the diameter of the hole than with the rate of input, which because of equipment considerations is often about the same regardless of the hole diameter. In the conventional air drilling of oil and gas wells, the hole diameter is usually less than 12 inches, and contains a heavy walled drill pipe of about 4 inches diameter. Air is circulated down the drill pipe, through the courses of the drill bit and up the annulus of the pipe and borehole. Sometimes the air is circulated down the annulus and up the drill pipe; this is commonly called "reverse" circulation and is preferable in applying pulverulent polymers to permeable formations in following this invention; reverse circulation brings the polymer more directly to the permeable formation. In boreholes of 12 inches and less diameter, the particle size of the pulverulent material may be relatively large, up to about 20-mesh, and be satisfactorily transported by the circulating gas. Finer particle sizes, down to 325-mesh and less are of course even more readily transported by the gas.

Large diameter boreholes are commonly drilled by the reverse circulation technique. Holes of a diameter of 6 feet may be drilled using a sturdy drill pipe of 6–8 inches diameter carrying an assembly of drill bits to make the 6 feet diameter cut. With reverse circulation the rate of flow of the gas in the annulus is ordinarily not critical to the drilling; the critical rate is in the drill pipe where the cuttings are being evacuated from the hole by the gas. Where a pulverulent material is employed to plug the permeable rock, the material is educted into the gas entering the annulus and is of such a size that it is transported by the gas into the rock pores as the gas escapes therethrough. The preferred sizes for the particles in this reverse circulation drilling are about 100 to 325-mesh, and less as they are readily transported in the large annulus by the slow moving gas. Furthermore they are a preferred size to become entrapped in the pores of a permeable formation where they later become swollen and plug the rock.

Water and other aqueous base solutions including brine solutions causing hydration and swelling of the pulverulent particles constitute satisfactory materials to use in the mist-forming step of the process. As an example, a solution of sodium meta silicate, commonly known as water glass, is a preferred aqueous solution; it has been found the water component produces hydration of the polymer and the sodium meta silicate acts as a film forming agent.

Similarly, it has been found that a water solution of sodium ortho silicate will function satisfactorily. A preferred concentration of a sodium silicate solution is on the order of 2%. Solutions of about ¼% to about 10% function satisfactorily. The sodium silicate film delays dehydration of the polymer which may otherwise occur after a time if water is not regularly supplied to the particles. The film seems to afford a barrier to the evaporation of the water from the swollen particles. Further, in instances where the particles are allowed to become partially or wholly dehydrated, the film prevents them from dislodging from the rock pores and surfaces.

To illustrates the plugging action of particles useful in the function of the invention, pulverulent limited crosslinked poly-acrylamide made according to the earlier described method and sufficiently particulated that all passed a 200-mesh sieve and about one third passed a 325-mesh, was educted into an air stream introduced at 10 p.s.i. into a closed sintered aluminum oxide cylinder of 12 inches length, 3 inches outside diameter and 2 inches inside diameter with the wall having a permeability of about 190 darcys and a porosity of 36%. About 9 grams of polymer were deposited on the wall of the cylinder. Readings were made of the air flow through the cylinder before and after introducing the polymer; the readings were essentially the same, showing the powdered dry polymer had not plugged the permeability. About 17 milliliters of a 2% solution of sodium meta silicate (having a composition of $Na_2O:SiO_2$ of 9:21) in mist form were introduced into the air stream, followed by a second charge of pulverulent polymer and a second charge of sodium meta silicate mist. An immediate reading of air flow through the cylinder wall showed only 0.6 cubic foot per minute.

The coating was allowed to age for 1½ hours; a reading of air flow at this time showed 1 cubic foot per minute. A charge of sodium meta silicate mist was introduced; an immediate reading of air flow showed no leak off. An air flow reading after ½ hour showed about ¼ cubic foot per minute.

The cylinder and coating was allowed to age 16 hours at which time the air flow was found to be 1.7 cubic feet per minute. A charge of water mist was introduced with the air; an immediate reading of air flow showed no leak off. After one hour a reading showed the leak off was ¼ cubic foot per minute.

These data amply demonstrate the utility of the process according to this invention in plugging rock permeability.

In an embodiment of the invention, a large diameter well is drilled using reverse circulation air to remove the cuttings and cool the drill bit. The borehole, 6 feet in diameter, encounters a highly permeable formation composed of volcanic tuff and breccia. After this formation has been penetrated about four feet, the amount of air returning via the drill pipe diminishes such that the drill cuttings cannot be lifted to the surface because of air escaping into the permeable formation. A valve in the air exit conduit is closed and injection of air is continued with sufficient pulverulent water swellable material introduced into the air stream to supply about 1½ ounces per square foot of permeable formation. This is followed immediately by a mist or fog created by educting into the air stream a solution of about 2% sodium meta silicate. About 1½–2 fluid ounces of solution are used per square foot of permeable formation. Air injection is continued for a period of ¼ hour, more or less with an observation being made to determine the rate of loss, if any, to the formation. If the loss is still significant, the process is repeated, and readings of loss made, until satisfactory plugging of the formation is obtained. Normally three or less applications are sufficient for plugging a permeable rock.

In instances where vugs and fractures are present and plugging may be slow because of the necessity of the pulverulent material being carried deeply into such openings, a coarse plugging agent filler may be advantageously blown in, usually following a liquid coating mist and followed by a coating mist. Coarse fillers such as are commonly employed with liquid drilling fluids, for example leather fiber, cotton seed hulls and chopped cellophane flakes are satisfactory.

Normal air drilling operations are resumed when the permeable formation areas are plugged. Plugging of the formation by the polymer is maintained by continually injecting sufficient water mist into the circulating air to maintain substantially 100% humidity in the air, or by periodically injecting a charge of mist into the circulating air. Ordinarily a charge about every hour and often every two hours will be sufficiently often. About 10–30 gallons of water are used, educted into and about 1000 cubic feet of the circulating air.

In instances where continued drilling penetrates further permeable formation; and loss of gas is again a problem, the process of this invention as herein described is repeated to eliminate the gas loss.

We claim:

1. In a process for drilling boreholes into the earth wherein a gas is circulated within the borehole, the method of preventing loss of said gas into a permeable earth formation which comprises mixing with said gas and circulating into said borehole a charge of a pulverulent solid from the group consisting of water swellable natural gums, synthetic polymers and clays and thereafter mixing with said gas and circulating into said borehole a charge of an aqueous base mist from the group consisting of water and water solutions of salts.

2. A process according to claim 1 wherein the water swellable solid is bentonite and the mist is water.

3. A process according to claim 1 wherein the water swellable solid is a crosslinked polyacrylamide and the mist is sodium silicate.

4. A process according to claim 1 wherein the particle size of the pulverulent solid is less than 200-mesh and the water solution of salt is of about 2% concentration.

References Cited by the Examiner

UNITED STATES PATENTS 2,818,230  12/1957  Davis _____ 175—69
3,111,178  11/1963  Marsh _____ 175—69

CHARLES E. O'CONNEL, *Primary Examiner.*
N. C. BYERS, *Assistant Examiner.*